United States Patent
Narasimhan

(10) Patent No.: US 8,155,054 B2
(45) Date of Patent: Apr. 10, 2012

(54) SUPPORTING IDLE STATIONS IN WIRELESS DISTRIBUTION SYSTEMS

(75) Inventor: Partha Narasimhan, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 804 days.

(21) Appl. No.: 11/830,752

(22) Filed: Jul. 30, 2007

(65) Prior Publication Data

US 2009/0034492 A1   Feb. 5, 2009

(51) Int. Cl.
*H04W 4/00* (2009.01)

(52) U.S. Cl. ......... 370/328; 370/311; 455/458; 455/524

(58) Field of Classification Search .................. None
See application file for complete search history.

(56) References Cited

U.S. PATENT DOCUMENTS

| | | | |
|---|---|---|---|
| 7,752,330 B2 * | 7/2010 | Olsen et al. | 709/232 |
| 2005/0210101 A1 * | 9/2005 | Janik | 709/203 |
| 2007/0253399 A1 * | 11/2007 | Deshpande et al. | 370/347 |
| 2007/0264955 A1 * | 11/2007 | Tsai et al. | 455/186.1 |
| 2008/0052366 A1 * | 2/2008 | Olsen et al. | 709/206 |
| 2008/0052548 A1 * | 2/2008 | Olsen et al. | 713/310 |
| 2008/0123577 A1 * | 5/2008 | Jaakkola et al. | 370/311 |
| 2008/0310391 A1 * | 12/2008 | Schneidman et al. | 370/349 |
| 2009/0052362 A1 * | 2/2009 | Meier et al. | 370/311 |
| 2009/0296618 A1 * | 12/2009 | Wang et al. | 370/311 |
| 2011/0039607 A1 * | 2/2011 | Karaoguz et al. | 455/574 |

OTHER PUBLICATIONS

Allan Thomson, Cisco Systems; Traffic Filtering and Sleep Mode; IEEE P802.11-07/2169r0; Jul. 2007.

* cited by examiner

*Primary Examiner* — Chi Pham
*Assistant Examiner* — Mohammad Adhami
(74) *Attorney, Agent, or Firm* — Blakely, Sokoloff, Taylor & Zafman LLP

(57) ABSTRACT

Supporting idle stations in an IEEE 802.11 wireless distribution system. When a station in an IEEE 802.11 wireless distribution system (DS) enters the idle state, it is not associated with any access points (APs) in the DS, Prior to entering the idle state, a station may establish filters indicating what traffic it wishes to receive. These filters are sent to a server in the DS. When a station goes idle, it is associated with a paging server in the DS, which buffers all received for the idle station, and initiates paging of the idle station when such traffic meeting filter criteria is received. When the station exits the idle state by reassociating with an AP in the DS, the server is notified, and forwards the buffered traffic to the station through its AP. The server may be implemented as a process running in a controller or portal in the DS.

13 Claims, 2 Drawing Sheets

SUPPORTING IDLE STATIONS IN WIRELESS DISTRIBUTION SYSTEMS

BACKGROUND OF THE INVENTION

The present invention pertains to wireless local area networks (WLANs), and more particularly, to methods of supporting idle stations in WLANs and wireless distribution systems (DS) operating under IEEE 802.11 standards.

In wireless local area networks, such as networks using the 802.11 model, consist of stations (STA) which are associated with access points (APs), which are in turn connected to a distribution system (DS). It should be noted that the DS is an abstract concept, and is not restricted to a particular implementation or technology.

FIG. 1 shows a wireless DS connected to a wired network as known to the art. DS 100 connects to wired network 200 through portal 110. Access points, 112, 114, 116, 118 provide wireless access to stations 120, 122, 124. As is known to the art, when a station associates with an AP, the DS is notified of this event so that incoming packets destined for the station are routed to the proper AP for delivery.

When a station is associated with an AP, such as station 124 associated with AP 116, implicit information is exchanged in order to keep the association state alive at both ends. For example, a STA may indicate to the AP that it is either going into power-save state or out of it by either setting bits in regular messages it sends to the AP or by sending a NULL data frame (a data frame with no payload) with bits in the header indicating change of state. The AP may set specific bits in the TIM (traffic indication map) information element in its beacons informing stations in power-save state that there may be packets buffered for them at the AP. Even though no explicit keepalive messages are exchanged, there is an expectation that an active connection be maintained by the station at all times.

In draft submission, document IEEE 802.11-07/2169r0 to the IEEE P802.11 group titled "Traffic Filtering and Sleep mode" on wireless LANs (incorporated herein by reference), a set of protocols and messages for supporting traffic filtering and idle mode is proposed While the draft defines messages and behavior, it does not specify implementation details. Under the proposal, a station associated with an AP may specify filter parameters indicating what traffic it wishes to accept. When the station goes into sleep mode, it is no longer associated with a particular AP. The station is paged when traffic passing the pre-established filter criteria is met. When the station wakes from the sleep state, it reassociates with an AP.

BRIEF DESCRIPTION OF THE DRAWINGS

The invention may be best understood by referring to the following description and accompanying drawings that are used to illustrate embodiments of the invention.

DETAILED DESCRIPTION

Figure 1:
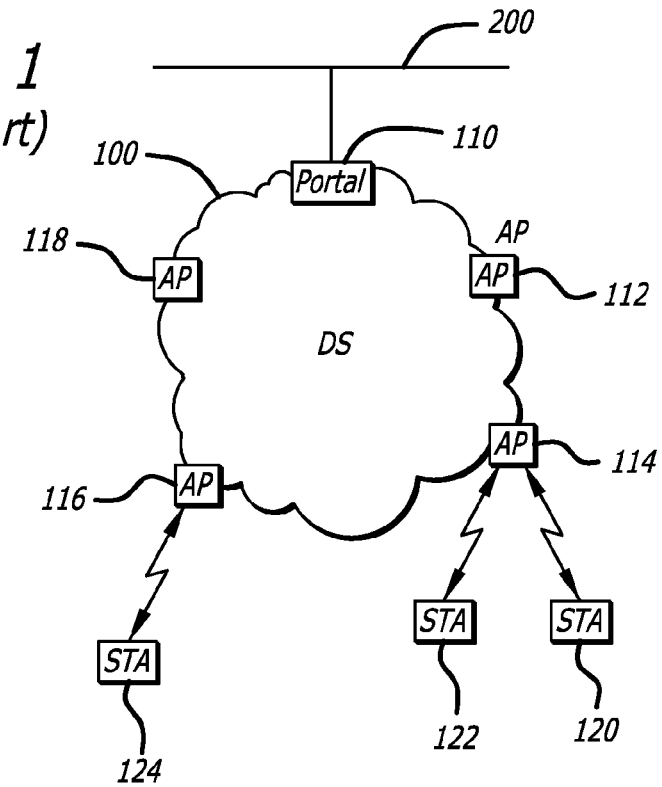
FIG. 1. shows a block diagram of a wireless distribution system (DS) as known to the art.
Figure 2:
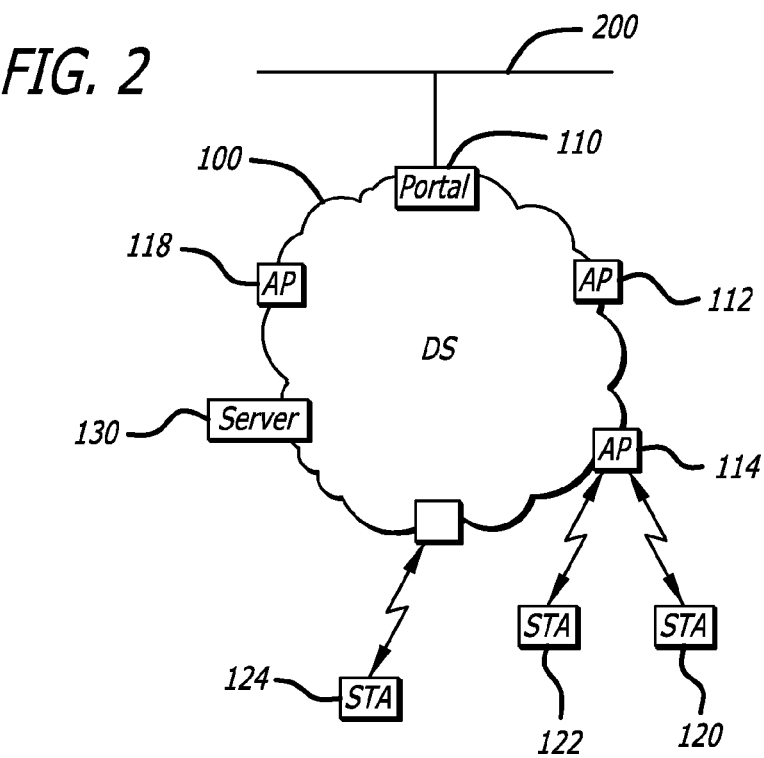
FIG. 2 shows a block diagram of a DS including a paging server.

Embodiments of the invention relate to a distribution system (DS) in a wireless IEEE 802.11 data network. In an embodiment of the invention, as shown in FIG. 2, sleep mode server 130 appears to DS 100 as another access point (AP). In operation, when a station such as station 124 goes into idle mode, it is associated with server 130. Once this association is made, DS 100 will direct traffic destined for station 124 to server 130. Server 130 buffers this traffic and initiates the process of paging station 124 by all APs within the DS. When station 124 exits idle mode and reassociates with DS 100, for example through AP 116, server 130 is notified of this event and sends the buffered traffic to station 124 through its associated AP.

Battery life is an important consideration in portable devices. A primary means of increasing battery life in a portable device is to reduce the power used by the device. One approach to reducing power, particularly in digital devices, is to use idle or sleep modes, wherein major portions of the device are operated in low power modes, or disabled completely.

Such reduced power modes introduce additional complexity, however, into wireless devices. In accordance with IEEE 802.11 wireless networking standards, once a station (STA) is associated with an access point (AP) which provides wireless services to that station, a fairly constant exchange of messages between AP and station continues, performing tasks such as synchronization. For wireless stations, listening for, and responding to these messages consumes power.

The IEEE 802.11 standard defines optional power save modes in which the station signals to the AP it is associated with that it wishes to enter a sleep state. If the AP supports sleep states, the AP acknowledges the request, and begins buffering packets for the station. This allows the station to reduce power to its wireless circuitry, while still maintaining an association with a specific AP. The AP still sends out regular beacon transmissions; if an AP has packets buffered for a sleeping station, it indicates this in the beacon transmissions. Sleeping stations wake periodically and check these beacon transmissions to see if the AP has packets waiting for it. If there are packets waiting, the station exits sleep mode, and retrieves the packets. The packets may require further activity, such as accepting an incoming VOIP call, or if no further activity is required, the station may transition back to sleep mode. Note that during this sleep mode, the station is still associated with an AP.

Buffering packets for sleeping clients is an expensive task for APs, requiring large buffers and complex management strategies.

Revisions to the 802.11 standard, such as those contemplated in the referenced proposal, include the addition of an "idle mode" where a station is not required to maintain an active association with a specific AP in the DS while it is in the idle mode. It is contemplated that this new "idle mode" will result in more power savings, since the station is no longer associated with a particular AP. The proposal also specifies messages and behavior for the station to specify a set of traffic filters, indicating what traffic the station wishes to be notified of. The proposal is also quiet on how these are to be implemented.

According to the present invention, a sleep mode server 130 is established for DS 100. Stations 120, 122, 124 associate with APs which are part of the DS. In the example of FIG. 2, station 124 is associated with AP 116. In accordance with the present invention, when station 124 associated with AP 116 establishes filters indicating the types of traffic the station wishes to receive, AP 116 forwards these filters to server 130. When station 124 enters idle mode, it is disassociated from AP 116. AP 116 signals server 130 when station 124 enters idle mode. Server 130 then signals DS 100 that station 124 is associated with it, with server 130.

Once associated with server 130, all traffic destined for station 124 goes to server 130. When packets arrive at server 130 for idle station 124, server 130 applies the previously set filters. When a packet satisfying the filter criteria for station 124 is met, server 130 pages station 124 through all APs defined for DS 100. When station 124 exits idle mode on decoding a page, it reassociates with an AP, for example AP 116. This reassociation is broadcast to all APs in DS 100, which includes server 130, When server 130 receives this reassociation information it then forwards saved packets for station 124 to the station's current AP, now AP 116.

It should be noted that while server 130 may functionally resemble an AP in DS 100, it does not transmit or receive wireless traffic. Rather, it stores filter settings and buffers traffic for idle stations which have been associated with it, initiates paging for idle stations through all APs associated with the DS, and forwards buffered frames to those stations when they exit the idle state and reassociate with an AP in the DS.

Figure 3:
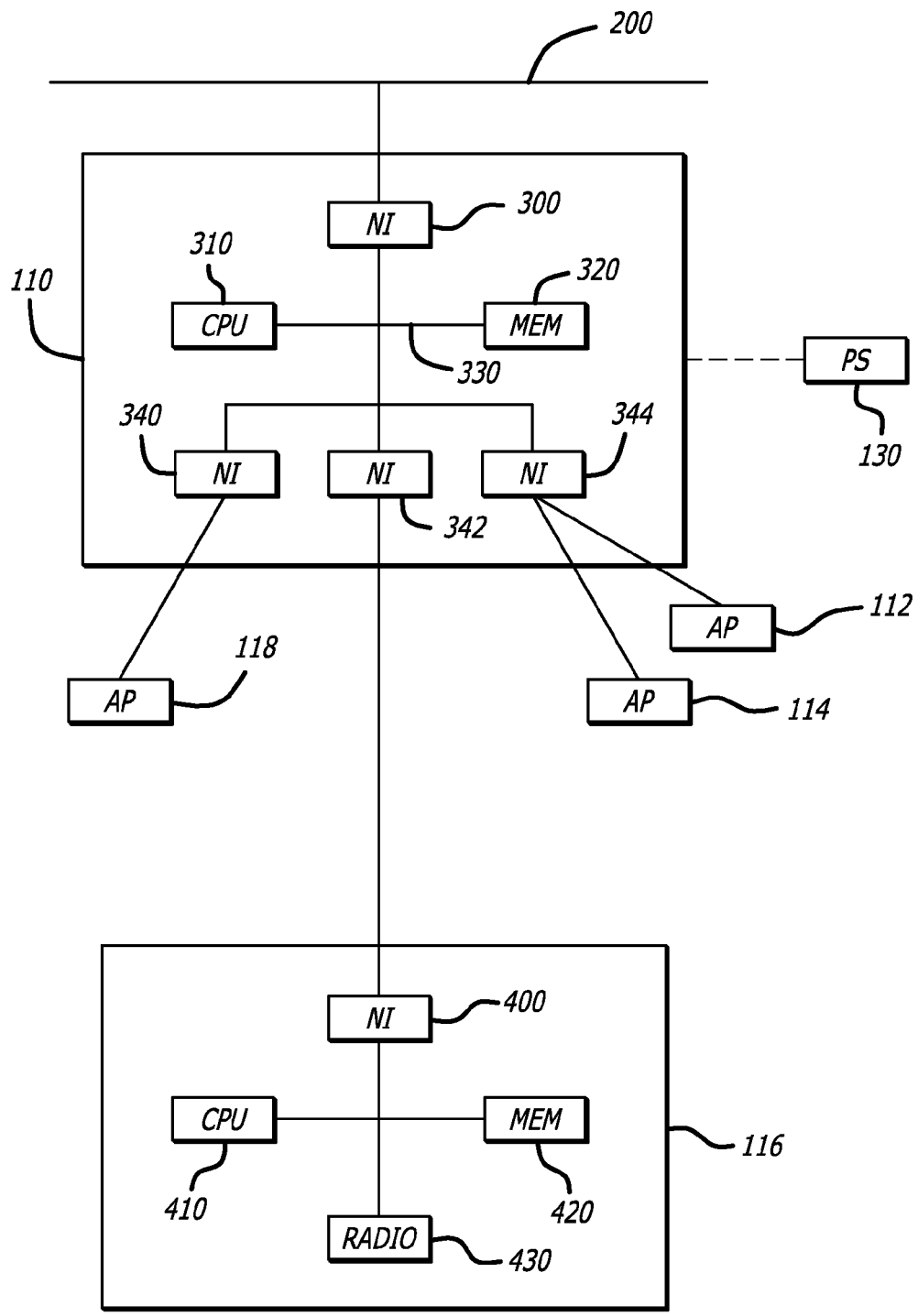
FIG. 3. shows a second block diagram of a DS including a paging server.

FIG. 3 shows a block diagram of a DS including a server according to an embodiment of the present invention. Portal 110 connects to wired network through network interface 300. Access points 112, 114, 116, and 118 also attach to portal 110. Portal 110 has CPU 310 and memory hierarchy 320 which communicates 330 with network interface 300 and network interfaces 340, 343, 344. Depending on the complexity of portal 110, the communication 330 among CPU, memory, and network interfaces may be simple interconnections and busses, or may be a more complex switching fabric. Memory hierarchy 320 typically contains high speed read-write memory as well as nonvolatile memory such as flash. Memory hierarchy 320 contains instructions and data which are executed or interpreted by CPU 310 to perform the various tasks and processes described herein, CPU 310 may be any suitable processor, such as those in the PowerPC, MIPS, or IA86 families. Network interfaces 300, 340, 343, 344 are typically Ethernet interfaces, with interfaces 340, 342, 344 optionally supporting IEEE 802.3 Power over Ethernet (PoE) standards such as 802.3af and 802.3at to provide power to APs 112, 114, 116, 118.

Access points (APs) 112, 114, 116, 118 are shown in a block diagram as representative AP 116. Network interface 400 connects to CPU 410 and memory hierarchy 420, and to radio 430. Radio 430 is typically a radio module designed for use with the 802.11a, b, g, or n standards. Such radio modules are available from Atheros Communications, among others. An AP may contain one or more radio modules. As an example, separate radio modules may be used for 2.4 GHz 802.11b/g/n and 5 GHz 802.11a. CPU 410 is typically a processor designed for embedded systems, such as a member of the MIPS family. Memory hierarchy 420 usually includes high speed read-write memory such as DRAM, as well as non-volatile memory such as flash. Memory hierarchy 420 contains instructions and data which are executed or interpreted by CPU 410 to perform the various processes and tasks described herein. In operation, an AP such as AP 116 may have all the programming information, code and data, required already present in memory 420. In other implementations an AP may only contain enough programming information in memory 420 to start up the AP and download further programming information from portal 110. In a highly integrated AP, CPU 410, network interface 400, and much of the support logic required for memory hierarchy 420 and radio 430 may be integrated into one or more complex integrated circuits, usually identified as system-on-chip (SOC) design.

As is understood by the art, such embedded systems as APs 112, 114, 116, 118 and portal 110 run under the control of an operating system such as one of the many Linux family of systems, or a proprietary system such as VxWorks.

According to an embodiment of the present invention, server 130 is a function of DS 100. Since server 130 does not require the ability to handle radio traffic directly, server 130 may be implemented as a process running in DS 100, as an example, in portal 110. While paging server 130 may be run as a process in an AP such as AP 112, or 114, APs are usually more resource-limited than controllers, with controller 110 most likely containing more memory and a faster processor than those used in the attached APs. Paging server 130 may also be hosted on separate hardware, such as a repurposed AP. In one embodiment, such a repurposed AP need not contain radios 430, and may contain additional read-write memory in memory hierarchy 420 to support additional buffering of traffic for idle stations.

In an embodiment such as that shown in FIG. 3, portal 110 controls a plurality of APs, which may represent one or more distribution systems (DS). Similarly, portal 110 may host multiple instances of server 130, one for each DS it serves.

While the invention has been described in terms of several embodiments, the invention should not be limited to only those embodiments described, but can be practiced with modification and alteration within the spirit and scope of the appended claims. The description is this to be regarded as illustrative rather than limiting.

What is claimed is:

1. A method of supporting wireless stations in a wireless distribution system having a portal and one or more access points comprising:

accepting by a first access point (AP) a set of filters from a station associated with the first AP;

receiving by the first AP signaling that the station entered into an idle mode;

signaling by the first AP to a server in the wireless distribution system that the station entered into the idle mode;

forwarding by the first AP the set of filters to the server, the set of filters being applied to messages directed to the station and received by the server through the plurality of access points in the wireless distribution system;

receiving by the first AP a re-association request from the station;

receiving a buffered message for the station from the server in response to the first AP broadcasting receipt of the reassociation request and in response to the buffered message matching at least one of the set of filters; and forwarding the buffered message to the station in response to the station reassociating with the first AP in the wireless distribution system.

2. The method of claim 1 where the server is a standalone device having no capability of transmitting or receiving wireless traffic.

3. The method of claim 1 where the server is a process running in the portal.

4. The method of claim 1 where the server is a process running in an access point (AP) of the one or more access points other than the first AP.

5. A non-transitory machine readable medium, implemented within an access point within a wireless distribution system including a portal and a plurality of access points, having a set of instructions stored therein, which when executed cause a set of operations to be performed, comprising:

accepting by the access point (AP) a set of filters from the station;

receiving by the AP signaling that the station entered into an idle mode;

signaling by the AP to a server in the wireless distribution system that the station entered into the idle mode;

forwarding by the AP the set of filters to the server, the set of filters being applied to messages directed to the station and received by the server through the plurality of access points in the wireless distribution system;

receiving by the AP a re-association request from the station;

receiving a buffered message for the station from the server in response to the AP broadcasting receipt of the re-association request and in response to the buffered message matching at least one of the set of filters; and forwarding the buffered message to the station in response to the station reassociating with the AP in the wireless distribution system.

6. The non-transitory machine readable medium of claim 5 having further instructions stored therein, which when executed cause a further set of operations to be performed comprising: prior to receiving the buffered message, paging the station based on signaling received by the server being adapted to receive and temporarily store messages for the station while the station is idle.

7. A method of supporting wireless stations in a wireless distribution system having a portal for connectivity to a wired network and at least one access point, the method comprising:

establishing a server in the wireless distribution system to specifically store information for one or more stations operating in an idle mode, the server is adapted to transmit or receive traffic from the at least one access point (AP);

receiving signaling by a first access point (AP), the signaling identifying that a station has entered into the idle mode and is disassociated from the first AP of the wireless distribution system;

storing messages destined for the station by the server after receipt of the signaling, the storing of messages being specifically conducted while the station remains in the idle mode;

receiving a set of filters originating from the station and provided by the first AP;

applying the set of filters to messages destined for the station by the server;

transmitting a page by the server to the station through a plurality of access points in the wireless distribution system in response to a message matching at least one of the set of filters, the page to cause the station to exit the idle mode;

receiving control information broadcast from a second AP over the wireless distribution system after the station has exited the idle mode and is associated with the second AP; and forwarding the stored messages destined for the station to the second AP for subsequent transfer to the station.

8. The method of claim 7 where the first AP is the same as the second AP.

9. The method of claim 8 where the server is a standalone device having no capability of transmitting or receiving wireless traffic.

10. The method of claim 7 where the server is a process running in the portal.

11. The method of claim 7 where the server is a process running in an access point (AP) of the wireless distribution system other than the first AP and the second AP.

12. The method of claim 7 where the first AP and the second AP are different access points.

13. The method of claim 7 where prior to receiving the control information broadcast from the second AP, the method further comprises paging the station by the server, without the paging being initiated by a device other than the server, when the information satisfies the set of filters.

\* \* \* \* \*